(12) United States Patent
Amirmokri

(10) Patent No.: US 10,124,916 B2
(45) Date of Patent: Nov. 13, 2018

(54) SPACE MODULAR REACTOR FOR PROPULSION (SMR-P)

(71) Applicant: Homi Nasrollah Amirmokri, North Potomac, MD (US)

(72) Inventor: Homi Nasrollah Amirmokri, North Potomac, MD (US)

(*) Notice: Subject to any disclaimer, the term of this patent is extended or adjusted under 35 U.S.C. 154(b) by 458 days.

(21) Appl. No.: 15/232,595

(22) Filed: Aug. 9, 2016

(65) Prior Publication Data
US 2018/0044041 A1 Feb. 15, 2018

Related U.S. Application Data

(60) Provisional application No. 62/205,242, filed on Aug. 14, 2015.

(51) Int. Cl.
*B64G 1/54* (2006.01)
*B64G 1/40* (2006.01)
*G21D 5/06* (2006.01)

(52) U.S. Cl.
CPC .............. *B64G 1/408* (2013.01); *B64G 1/54* (2013.01); *G21D 5/06* (2013.01)

(58) Field of Classification Search
CPC . B64G 1/40; B64G 1/408; B64G 1/54; G21D 5/06
See application file for complete search history.

(56) References Cited

U.S. PATENT DOCUMENTS 3,528,245 A * 9/1970 Sitney .................... B64G 1/401
165/140

* cited by examiner

*Primary Examiner* — Justin M Benedik

(57) ABSTRACT

This invention serves as the fundamental design for a space-based, nuclear-powered spacecraft for deep space journeys. Nuclear energy is used as the motive power for the propulsion. The spacecraft propellant is a gas (such as helium or hydrogen), which is also the coolant for the onboard nuclear reactor. Nuclear energy is converted to thermal energy in the reactor, which heats up the propellant gas. That superheated gas then expands through the spacecraft nozzle and creates the thrust. The nuclear fuel consists of high enriched uranium. The amount of fuel is mission dependent, and requires declaration of payload, and desired speed, which is limited to sub-light for the first generation of this invention. The spacecraft will be assembled in, and launched from low earth orbit. The spacecraft final assembly consists of modular components delivered to low earth orbit from earth by conventional chemical rockets.

2 Claims, No Drawings

SPACE MODULAR REACTOR FOR PROPULSION (SMR-P)

This invention claims the benefit of a provisional patent, Application No. 62/205,242, Filing Date Aug. 14, 2015, by this inventor.

BACKGROUND

Nuclear Energy as motive power for propulsion provides superior performance in terms of bigger payload capacity and much higher speed over conventional chemical or solar-powered rockets. In fact, deep space missions are not economically feasible without nuclear energy. This invention focuses on replacing both chemical and solar-powered rockets with nuclear-powered rockets for deep space journeys.

DESCRIPTION

The propulsion section consists of two primary modules: (1) the reactor module, and (2) the propulsion propellant module, also known as the reactor coolant module. It is noted here that the spacecraft propellant is in fact the nuclear reactor coolant, which is a gas. The modules are cone-shaped, and designed in a concentric geometry (i.e., having a common center). They are assembled in sequence in low earth orbit, that is one on-the-top-of the other, as described below.

Metaphorically speaking, in a non-scientific description, one might imagine that each module to look like an ice-cream cone. And, the entire propulsion-assembly to look like an ice-cream cone-dispenser, tubular pull-type, without the outer shell or casing. Each module will have locking mechanisms, as well as all the necessary interconnecting utilities, transfer-lines, etc.

SMR-P is a very-high-temperature gas-cooled nuclear reactor. The provision for obtaining the nuclear fuel is not included in this effort. The customer is required to purchase the nuclear fuel, per specifications, from authorized sources, or establish own nuclear fuel production capability as permitted by law. The once-through reactor coolant is a gas as it enters the reactor. The reactor has a uranium-235 core, which provides heat from fission reactions. The gas (i.e., the reactor coolant, which is also the spacecraft propellant) passes through the reactor core and is heated to a very high temperature, which then expands through the spacecraft nozzle, and creates the thrust. It is however stored as liquid, during transportation from earth to low earth orbit and assembly at the Low Earth Orbit Propellant Depot—similar to that of conventional chemical rockets.

The nuclear fuel consists of High Enriched Uranium, which weighs much less than similar amount of fuel for chemical rockets. The amount of nuclear fuel is mission dependent. The fuel however will be designed such that it will be sufficient for the journey plus reserve. The reactor power is mission specific, and depends on the customer's speed and payload requirements. The nuclear fuel specifications will be provided following the customer's description of the mission, and declaration of speed and payload requirements.

A number of gases, such as helium, hydrogen, etc., are envisioned to be used for reactor coolant/the spacecraft propellant, depending on availability, economics, and/or the mission specifics. Additional or spare reactor coolant module(s) may be incorporated into the spacecraft design, for multi-generational journey as the mission evolves. This concept envisions that for a multi-generational journey, the spacecraft is so equipped with: (A) all the necessary provision to scoop and store reactor coolant gases from the atmospheres of en route planets, and/or (B) spare reactor coolant modules.

In all cases, the reactor coolant modules are designed to follow the reactor module, in that order, to provide radiation shielding. Other modules, such as instrumentation, electric power, scientific equipment, supplies, and/or crew, will follow the reactor coolant modules, in a similar fashion.

It is not the intent of this effort to describe the rest of the spacecraft design. It is sufficed to say that the instrumentation/supplies/equipment/electric power modules, as well as the crew module (if any) will also be carried into low earth orbit and dock with the propulsion section as described below.

For spacecraft assembly, all modules, either individually or in combination, will be carried into low earth orbit by conventional chemical rockets, similar to what is being used to carry parts, and supplies to the International Space Station (ISS).

Subsequently, the reactor coolant module docks with the reactor module, in a Low Earth Orbit Propellant Depot, in a similar manner as the ISS and supply rockets do. Other modules, such as instrumentation, supplies, electrical power, scientific equipment modules, as well as the crew module (if any), will be assembled in the similar fashion.

SUMMARY

The purpose of this effort is to delineate the propulsion section of a space-based, nuclear-powered spacecraft, for deep space journeys, which will be assembled and launched from low earth orbit. The spacecraft final assembly consists of modular components delivered to low earth orbit from earth by conventional chemical rockets.

I claim:

1. A modular nuclear reactor for space propulsion of a spacecraft comprising:
    (a) a nuclear reactor module having a top-end and a bottom-end, which consists of a reactor and a high enriched uranium core, the reactor converts nuclear energy to thermal energy, wherein the nuclear reactor module is cone-shaped and designed in a concentric geometry with a common center, including locking mechanisms and all interconnecting utilities and transfer-lines such that it can be coupled with another module, in low earth orbit;
    (b) a propulsion propellant module that contains a gas being one of helium or hydrogen, the propulsion propellant module is cone-shaped and designed in a concentric geometry with a common center, including locking mechanisms and all interconnecting utilities and transfer-lines such that it can be coupled with another module, in low earth orbit; wherein the thermal energy from the reactor is designed to be transferred to the propulsion propellant module's gas as it passes through the reactor, the gas becoming superheated and expending through a nozzle creating thrust for the spacecraft, wherein the nozzle is designed at the bottom-end of the nuclear reactor module, and wherein the spacecraft includes
    (c) instrumentation, supplies, equipment, electric power, and crew modules also cone-shaped and designed in a concentric geometry with a common center, including locking mechanisms and all interconnecting utilities and transfer-lines such that it can be coupled with another module, in low earth orbit; wherein (d) the propulsion propellant module is designed to provide radiation shielding, and further designed to couple with the top-end of the nuclear reactor module first; the instrumentation, supplies, equipment, electric power, and crew modules are designed to couple with the propulsion propellant module in the specified sequence; and wherein (e) the assembly of the spacecraft is designed to take place in low earth orbit.

2. The modular nuclear reactor for space propulsion of a spacecraft of claim 1 wherein all modules, either individually or in combination, are designed to be carried into low earth orbit by conventional chemical rockets.

* * * * *